United States Patent
Sigg et al.

(10) Patent No.: US 8,112,083 B1
(45) Date of Patent: Feb. 7, 2012

(54) METHOD AND SYSTEM FOR DYNAMIC ADJUSTMENT OF RADIO FREQUENCY REGISTRATION PERIOD BASED ON LOAD CONDITIONS

(75) Inventors: Jason Sigg, Olathe, KS (US); Hector M. Ribas, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 561 days.

(21) Appl. No.: 11/038,944

(22) Filed: Jan. 18, 2005

(51) Int. Cl.
*H04W 4/00* (2009.01)

(52) U.S. Cl. .............. 455/435.1; 455/434; 455/453; 455/408

(58) Field of Classification Search ............ 455/435.1, 455/453, 408, 409, 434
See application file for complete search history.

(56) References Cited

U.S. PATENT DOCUMENTS

| | | | | |
|---|---|---|---|---|
| 5,754,959 | A * | 5/1998 | Ueno et al. | 455/453 |
| 5,794,140 | A * | 8/1998 | Sawyer | 455/408 |
| 6,014,694 | A | 1/2000 | Aharoni et al. | |
| 6,078,568 | A | 6/2000 | Wright | |
| 6,078,957 | A | 6/2000 | Adelman et al. | |
| 6,108,542 | A * | 8/2000 | Swanchara et al. | 455/434 |
| 6,393,285 | B1 * | 5/2002 | Stephens | 455/435.1 |
| 6,681,256 | B1 | 1/2004 | Kuntze et al. | 709/236 |
| 6,819,926 | B2 * | 11/2004 | Karlsson et al. | 455/433 |
| 7,213,065 | B2 | 5/2007 | Watt | |
| 2002/0090945 | A1 * | 7/2002 | Sasada | 455/435 |
| 2002/0152432 | A1 | 10/2002 | Fleming | |
| 2002/0152446 | A1 | 10/2002 | Fleming | |
| 2004/0230661 | A1 | 11/2004 | Rashid | |
| 2004/0243702 | A1 | 12/2004 | Vainio et al. | |
| 2004/0252669 | A1 | 12/2004 | Hosein | |
| 2005/0009534 | A1 * | 1/2005 | Harris et al. | 455/453 |
| 2010/0020781 | A1 | 1/2010 | Tayloe | |
| 2011/0045824 | A1 | 2/2011 | Bischoff | |

OTHER PUBLICATIONS

M. Handley et al, RFC, 2543, SIP: Session Initiation Protocol, Mar. 1999, first page.
S. Donovan et al., Session Initiation Protocol Extension for Session Timer, Jul. 1, 2002, Internet Engineering Task Force.
M. Mangal et al, U.S. Appl. No. 10/667,881, Method and system for updating network presence records at a rate dependent on network load, filed Sep. 22, 2003.
Office Action for U.S. Appl. No. 10/667,881, mailed Jun. 11, 2008.
Office Action for U.S. Appl. No. 10/667,881, mailed Jan. 10, 2008.
Office Action for U.S. Appl. No. 10/667,881, mailed Oct. 17, 2007.
Office Action for U.S. Appl. No. 10/667,881, mailed May 4, 2007.

* cited by examiner

*Primary Examiner* — Patrick N Edouard
*Assistant Examiner* — Chuck Huynh (57) ABSTRACT

A method for handling registration requests in a cellular wireless communication system. The method includes determining that an air interface in the cellular wireless communication system has at least a threshold level of load. The method further includes, in response to the determination that the system has at lease a threshold level of load, reducing a frequency at which mobile stations register with the cellular wireless communication system via the air interface.

18 Claims, 6 Drawing Sheets

METHOD AND SYSTEM FOR DYNAMIC ADJUSTMENT OF RADIO FREQUENCY REGISTRATION PERIOD BASED ON LOAD CONDITIONS

BACKGROUND

I. Field

This invention relates to cellular wireless telecommunications and, more particularly, to management of radio-frequency registration periods.

II. Description of Related Art

In a cellular wireless communication system, an area is divided into cells, which are further divided into cell sectors ("sectors"). Each cell and cell sector is defined by a radiation pattern from a respective base transceiver station (BTS), which includes a radio-frequency antenna tower. Each BTS is then typically connected with a base station controller (BSC), which, together with the BTS, defines a "base station." Further, the BSC may then be connected with a switch (e.g., mobile switching center (MSC)) or gateway (e.g., packet data serving node (PDSN)) that provides connectivity with a transport network, such as the public switched telephone network (PSTN) or the Internet. With this arrangement, a cell phone or other wireless communication device (generally "mobile station") that is positioned within the coverage area of a given sector can communicate over an air interface with the BTS and in turn via the BSC and switch or gateway with entities on the transport network.

Unlike landline telephones that exist at known, fixed locations, mobile stations can operate at virtually any location where a wireless carrier provides radio-frequency coverage. Consequently, in order for a mobile station to be able to engage in useful communications (voice or data) in a cellular wireless communication system, the mobile station must first register with the system. This registration process lets the system know where the mobile station is located (e.g., for purposes of directing calls to the mobile station) and so that the system can verify that the mobile station is authorized to be operating in the system.

The manner in which a mobile station registers with a cellular wireless communication system can take various forms, depending on factors such as the configuration of the system and on the communication protocols used. For example, such registration may be accomplished using Code Division Multiple Access ("CDMA"). CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

In a system operating according to the CDMA2000 protocol, for instance, a mobile station registers by sending over the air to the base station an "access probe," which carries an identifier of the mobile station and perhaps other pertinent information. The mobile station sends the access probe in a "slotted aloha process." In the slotted aloha process, the mobile station repeatedly sends the access probe at increasingly higher power levels until it receives an acknowledgement message from the base station, or until it otherwise exhausts the process (e.g., the maximum transmission power of the mobile station is reached and no acknowledgment has been received). As is described in the CMDA2000 specifications, each access probe travels in a timeslot of an air interface access channel from the mobile station to the base station, while each registration acknowledgement travels in a timeslot of an air interface paging channel from the base station to the mobile station.

When the base station receives an access probe from a mobile station, the base station passes the access probe along to the switch (e.g., an MSC) or other entity (e.g., a PDSN), which then responsively sends a registration notification message to the mobile station's home location register (HLR). The HLR then updates the mobile station's profile to indicate where the mobile station is operating (e.g., which switch is serving the mobile station) and may further carry out an authentication process, and then sends a registration response, which propagates to the mobile station. If the mobile station has registered with a base station that is not in its "home network" (e.g., operated by the wireless provider with which the mobile station is associated), the registration information for the mobile station is stored in a visitor location register (VLR) in the network in which the mobile station is operating (which may be termed "roaming"), as well as in an HLR in the mobile station's home network.

Various trigger events can cause mobile stations to register with the system. In a CDMA2000 system, for instance, a mobile station will generally register (i) whenever it enters a new zone (e.g., sector and/or cell) in response to a distinct "reg_zone" parameter the mobile station receives in an air interface control channel message from the base station, (ii) on a periodic basis, with a period indicated by a "reg_period" parameter (or directive) that the mobile station receives in an air interface control channel message from the base station, and (iii) when the mobile station receives or places a call.

In some situations, the air interface between a base station (e.g., a particular sector associated with the base station) and mobile stations operating within the coverage area of the base station can become overwhelmed with too much use. This can happen, for example, if too many mobile station registrations occur at once. In a CDMA2000 system, for instance, if access probes from two or more mobile stations line up (by chance) in the same timeslot of the access channel, an "access probe collision" occurs. The result of such a collision is that none of the probes will succeed, principally because the base station will not receive any of the probes in a comprehensible form due to interference between the multiple access probes. Thus, should such a collision occur, each mobile station would have to re-send its access probe, because it would not receive an acknowledgement from the base station.

In many situations, access probe collisions are not very likely to occur because sufficient timeslots exist on the access channel for transmitting the access probes. However, in situations where many users are placing calls at once, the number of access probes and access probe collisions can increase dramatically due to collisions and associated retries. For example, after a football game or in an emergency situation, many people within a given sector of a specific cell site may use their mobile phones to place calls (e.g., to call 911, to call friends and family, to check voice mail, or for other purposes).

Each time a mobile station places a call, as was noted above, the mobile station sends an access probe. Consequently, in a situation where many people within a given sector place calls at once, many access probes will be sent at once. In turn, access probe collisions then occur and, therefore, still more (retry) access probes are sent. Further, as these collisions and retries are occurring, other mobile stations in the sector are periodically registering with the system, according to the "reg_period" directive from the base station, which will still further increase the frequency of access probe collisions. In a CDMA2000 system, the reg_period directive includes the frequency with which mobile stations periodically register with the system.

Such access probe collisions may result in mobile stations being unable to place calls, receive calls, send data and/or receive data, as the mobile stations may be unable to successfully register with the system due to the occurrence of access probe collisions. One technique that has been employed to address this situation is to block termination of calls to mobile stations (not complete calls to mobile stations) when the load on the air interface of a sector exceeds a certain threshold level. This approach, however, is undesirable as it is inconvenient to calling parties, who have to repeatedly place their calls until the load on the air interface is reduced below the threshold level and also will result in users of the wireless communications system missing calls.

SUMMARY

Systems and methods for dynamic adjustment of radio frequency registration periods based on load conditions are disclosed. These systems and methods help alleviate the burden on an air interface of a wireless communications system due to large numbers of registration requests, which can result in access probe collisions. Such a burden on the air interface may occur, for example, in a CDMA2000 system, as a result of a large number of contemporaneous call originations occurring within a coverage area of a particular sector. In this situation, also conducting high frequency periodic registrations for mobile stations within the coverage area of the particular sector will add to the number of access probes communicated to the base station and can, as a result, increase the occurrence of access probe collisions. This situation, as was discussed above, is undesirable as it may result in the mobile stations within the coverage area of the particular sector being unable to place or receive calls and/or unable to send or receive data.

A method that helps to solve this problem includes (i) determining that an air interface (e.g., of a given sector) of a wireless communications network has at least a threshold level of load, and (ii) in response to this determination, automatically increasing the registration period, so as to reduce the frequency of periodic mobile station registrations. It will be appreciated that these functions can be carried out by a base station, such as by a BTS and/or a BSC, However, these functions could also be carried out by other network elements as well, such as an MSC, a PDSN, or any number of other communications system platforms.

The process of determining that the air interface has at least a threshold level of load can be accomplished in a number of ways. In a first embodiment, the process includes detecting at least a threshold level of reverse-link air interface load (where "reverse-link" means the air interface link from mobile stations to the base station, as compared with "forward-link," which means the link from the base station to the mobile stations).

More particularly, in a CDMA2000 system, the process of this first embodiment includes determining that at least a threshold percentage of access channel timeslots are occupied over a given period of time. This determination can be made by the base station. For example, the base station may include service logic that, when executed, determines what percentage of the access channel timeslots contain energy that is sufficient to be an access probe within a designated time period (e.g., every 1 minute, every 5 seconds, etc.). The number of occupied time slots should include timeslots that contain sufficient energy to represent an access probe but do not actually contain a verifiable access probe (e.g., where a cyclic redundancy check establishes that the timeslot does not contain a legitimate access probe), as such timeslots may exist as the result of access probe collisions. If the determined percentage exceeds a designated threshold, then the base station concludes that the air interface has at least a threshold level of load. In this situation, the base station responsively increases the periodic registration period (e.g., via the reg_period directive) to reduce that loading and communicates the increased period to the mobile stations operating in the coverage area of the respective sector.

In another embodiment, the base station tests for the presence of at least a threshold level of forward-link load to determine air interface loading. This embodiment may be implemented in conjunction with or as an alternative to testing for a threshold reverse-link load. For example, in a CDMA2000 system, the base station can determine if at least a threshold percentage of paging channel timeslots are occupied over a given period of time. As noted above, access probe acknowledgements travel in a paging channel of the forward-link, so when the paging channel is more occupied, there is more likelihood that access probe acknowledgements might be delayed or not sent, thereby triggering further access probes and exacerbating the access probe collisions problem further.

In yet another embodiment (which may be implemented as an alternative to, or in conjunction with one or both the embodiments described above), the base station can further test for a threshold "stationary nature" of the mobile stations in the coverage area at issue. In this context, a "stationary" mobile station may be defined as a mobile station that remains within a given coverage area (e.g., of a sector and/or cell) for a certain period time (such as the period defined by the reg_period directive).

Such an approach takes into account that the more a mobile station moves, the more likely it is that if the mobile station does not register often enough with the system, the system will be unable to reach the mobile station, such as to terminate (route) an incoming call to the mobile station. In a situation where a large number of mobile stations in a given coverage area are generally stationary (remaining within the given coverage area), it may be advantageous to reduce the frequency of the mobile stations' periodic registrations to reduce the load on the air interface.

These and other aspects will become apparent to those of ordinary skill in the art by reading the following detailed description, with reference, where appropriate, to the accompanying drawings. Further, it should be understood that the embodiments noted in this summary are only examples and not intended to limit the scope of the invention as claimed.

BRIEF DESCRIPTION OF THE DRAWINGS

Exemplary embodiments of the present invention are described herein with reference to the drawings, in which.

DETAILED DESCRIPTION

While embodiments of systems and methods for dynamic adjustment of registration periods based on load conditions are discussed generally in the context of CDMA wireless communication systems, it will be appreciated that the invention is not limited in this respect and that embodiments of the invention may be implemented in any number of types of wireless communication systems, such as time division multiple access (TDMA) systems and global system for mobile communications (GSM) systems, for example. As in most telecommunication and data applications, it will also be appreciated that many of the elements of the various embodiments described herein are functional entities that may be implemented as hardware, firmware and/or software. Additionally, many of these elements may be implemented as discrete components or in conjunction with other components, in any suitable combination and location.

Organization of the Disclosure

This disclosure is organized as follows. A wireless communications system (including an air interface) in which the disclosed methods and systems may be implemented is discussed generally with reference to FIG. 1. The air interface between the mobile stations and the base station of FIG. 1 as it relates to mobile station registration is described in further detail with reference to FIG. 2. Communication of access probes and access probe collisions in a reverse-link access channel are described with reference to FIG. 3 A specific example of a situation where implementing the disclosed methods and systems may be advantageous is described with respect to FIG. 4. And methods for dynamically adjusting the registration period for mobile stations in the system 100 of FIG. 1 are described with reference to FIGS. 5-9.

Wireless Communications System

Figure 1:
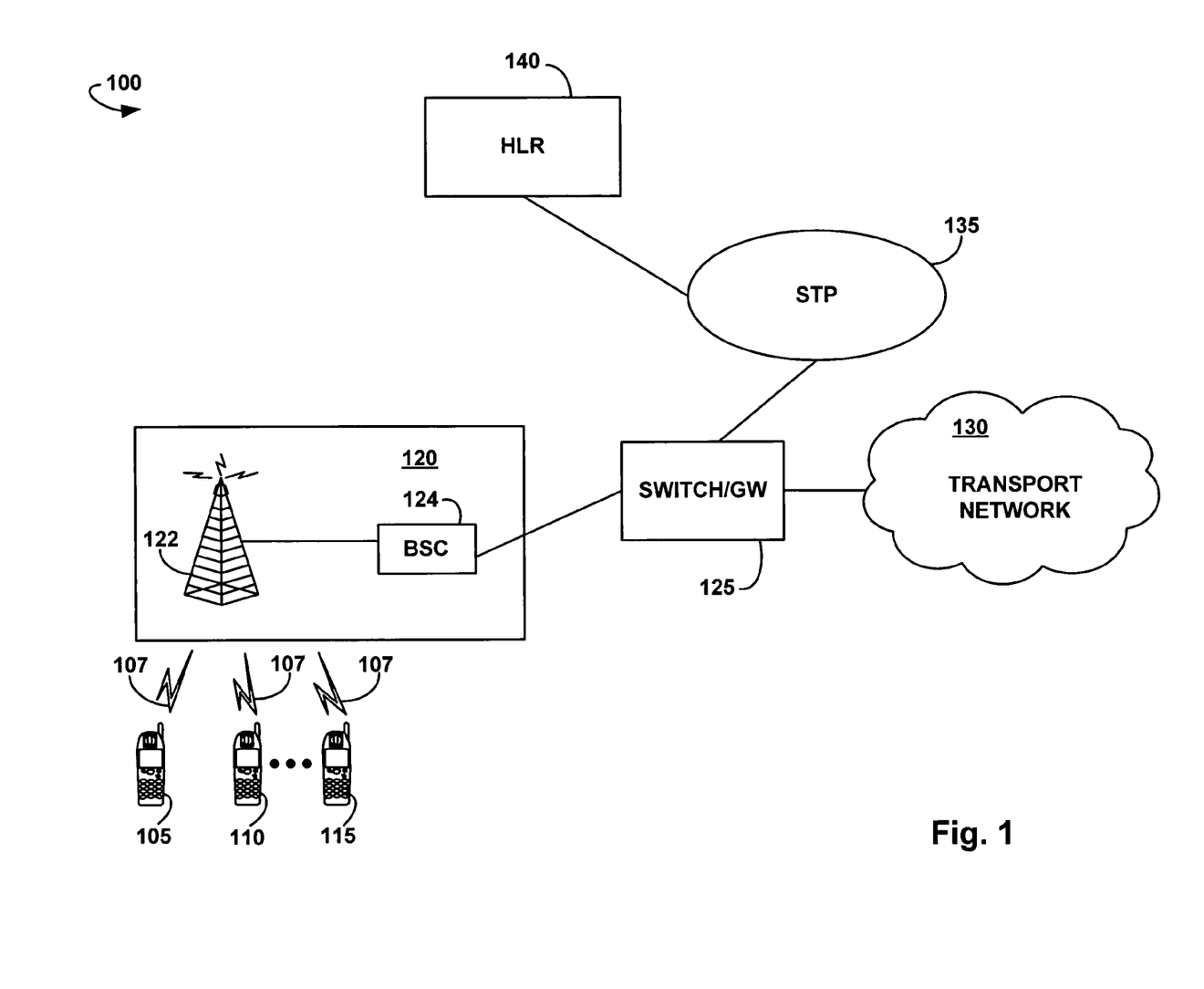
FIG. 1 is a diagram illustrating a wireless communications system in which the embodiments disclosed here may be implemented.

FIG. 1 is a diagram that illustrates a wireless communication system 100 in which the embodiments described in this disclosure may be implemented. System 100 includes a plurality of mobile stations 105, 110 and 115, which may be cellular phones, wireless personal digital assistants, a wireless enabled computer or any other device capable of wireless communication in system 100. System 100 generally illustrates a configuration of a CDMA2000 compliant system. As is indicated by the dotted line in FIG. 1, system 100 may include any number of mobile stations.

The mobile stations 105, 110 and 115 communicate, via a radio air interface 107, with a base station 120. The base station 120 includes a base-station transceiver (BTS) 122 and a base-station controller (BSC) 124. The BTS 122 communicates with the mobile stations 105, 110 and 115 using radio-frequency signals over the air interface 107. The BTS 122 also communicates with the BSC 124 to communicate voice and/or data information to and from the mobile stations 105, 110 and 115.

The base station 120 is, in turn, coupled with a switch/gateway 125. The switch/gateway 125 may take the form of any number of devices. For example, for voice communication, the switch/gateway 125 may comprise a mobile switching center (MSC). Alternatively, for data communication the switch/gateway 125 may comprise a packet data serving node (PDSN). MSCs and PDSNs are both described in further detail in the CDMA2000 specifications and are not discussed in detail here for the purpose of brevity. Also, it will be appreciated that additional switch/gateway devices or systems may be coupled with the base station 120.

The switch/gateway device 125 is also coupled with a transport network 130. As was described above, for voice communications, the transport network 130 may take the form of the public switched telephone network. Alternatively, for data communication, the transport network 130 may take the form of the public Internet or any suitable data network, such as a private packet data network.

The switch/gateway 125 is further coupled with a signal transfer point (STP) 135. The STP 135 provides for the transfer of signals between different entities in the system 100. For the particular embodiment shown in FIG. 1, the STP 135 provides for transferring signals between the switch/gateway 125 and a home location register (HLR) 140. In accordance with the CDMA2000 specification, the HLR includes registration information for the mobile stations 105, 110 and 115. This registration information includes, for example, a unique mobile identification number for each of the mobile stations.

For any mobile station that may be operating outside its home network (e.g., "roaming"), system 100 may include the registration information for that mobile station in a visitor location record (VLR), which may be implemented in conjunction with the HLR 140 or may be implemented separately. In this situation, the registration information for the roaming mobile station is also included in an HLR of the roaming mobile station's home network so that calls to the mobile station are properly routed. Additionally, the system 100 may include other entities that are coupled with the STP 135, such as additional switch/gateways devices, service nodes, or any number of other platforms or devices for providing communication services in system 100.

Air Interface and Mobile Registration

Figure 2:
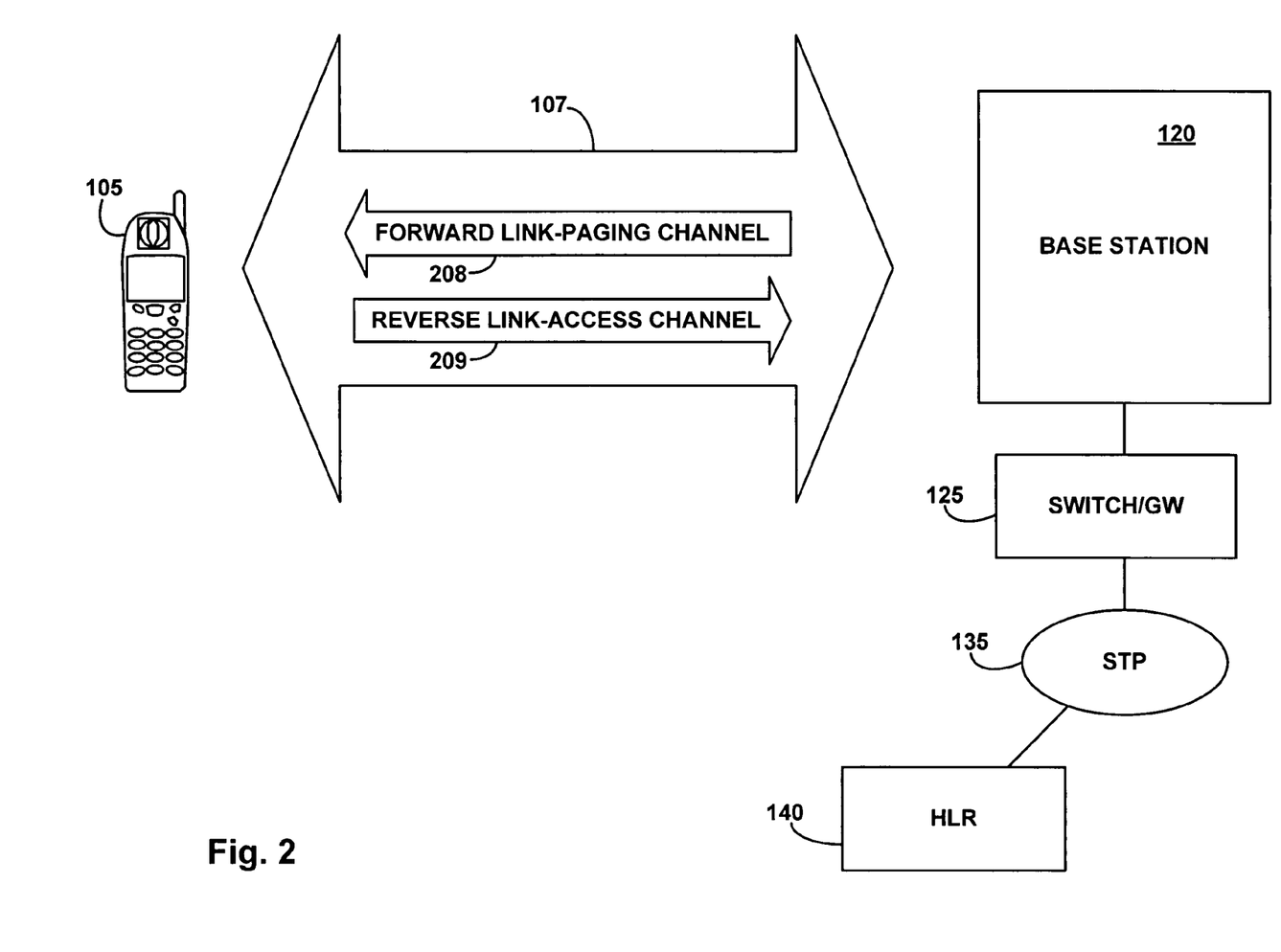
FIG. 2 is a diagram illustrating the air interface of the wireless communications system of FIG. 1 in more detail.

FIG. 2 is a diagram that illustrates a portion of system 100, with the air interface illustrated in more detail. The elements of the system 100 that are shown in FIG. 2 are those elements that are involved in the registration of the mobile station 105 for this particular embodiment. As was discussed above, there are various trigger events that can cause mobile stations to register in a CDMA2000 system. These events include (i) the mobile station 105 receiving a "reg_zone" directive from the base station 120 via a control channel message in the air interface 107. (ii) the mobile station 105 registering on a periodic basis, with a period indicated by a "reg_period" directive that the mobile station 105 receives in a control channel message from the base station 120, and (iii) when the mobile station 105 receives or places a call. The control channel is not specifically shown in FIG. 2.

The mobile station 105 registers with system 100 by sending an access probe via the reverse-link access channel 209 of the air interface 107. The access probe includes information that identifies the mobile station 105. This information may include an indication of the service provider with which the mobile station 105 is associated and a unique mobile identification number of the mobile station 105. The base station 120 receives the access probe and communicates the access probe to the switch/gateway, which then responsively sends a registration notification message to the HLR 140 via the STP 135.

The HLR 140 then updates the mobile station 105's profile to indicate where the mobile station 105 is operating (e.g., which switch/gateway and base station are serving the mobile station 105). Additionally, the HLR 140 may also carry out an authentication process to ensure the mobile station 105 is authorized to operate in the wireless communications system 100. The HLR 140 then sends a registration response, which propagates to the mobile station 105 via the STP 135, the switch/gateway 125 and the base station 120. The base station 120 communicates the registration response message to the mobile device 105 via a forward-link—paging channel 208 of the air interface 107. Regardless of the trigger that results in registration occurring, this registration process will be essentially the same fir a mobile station registering in its home network.

However, as noted above, this process may be somewhat different if the mobile station 105 has registered through a base station that is not in its "home network." In this instance, the registration information for the mobile station 105 is stored in a visitor location register (VLR) in the network in which the mobile station 105 is operating (a "foreign network"), as well as in an HLR in the mobile station 105's home network. In this situation, the mobile station 105 may be referred to as "roaming" (e.g., operating in a radio frequency coverage area outside its home network).

Access Channel Timeslots and Access Probe Collisions

Figure 3:
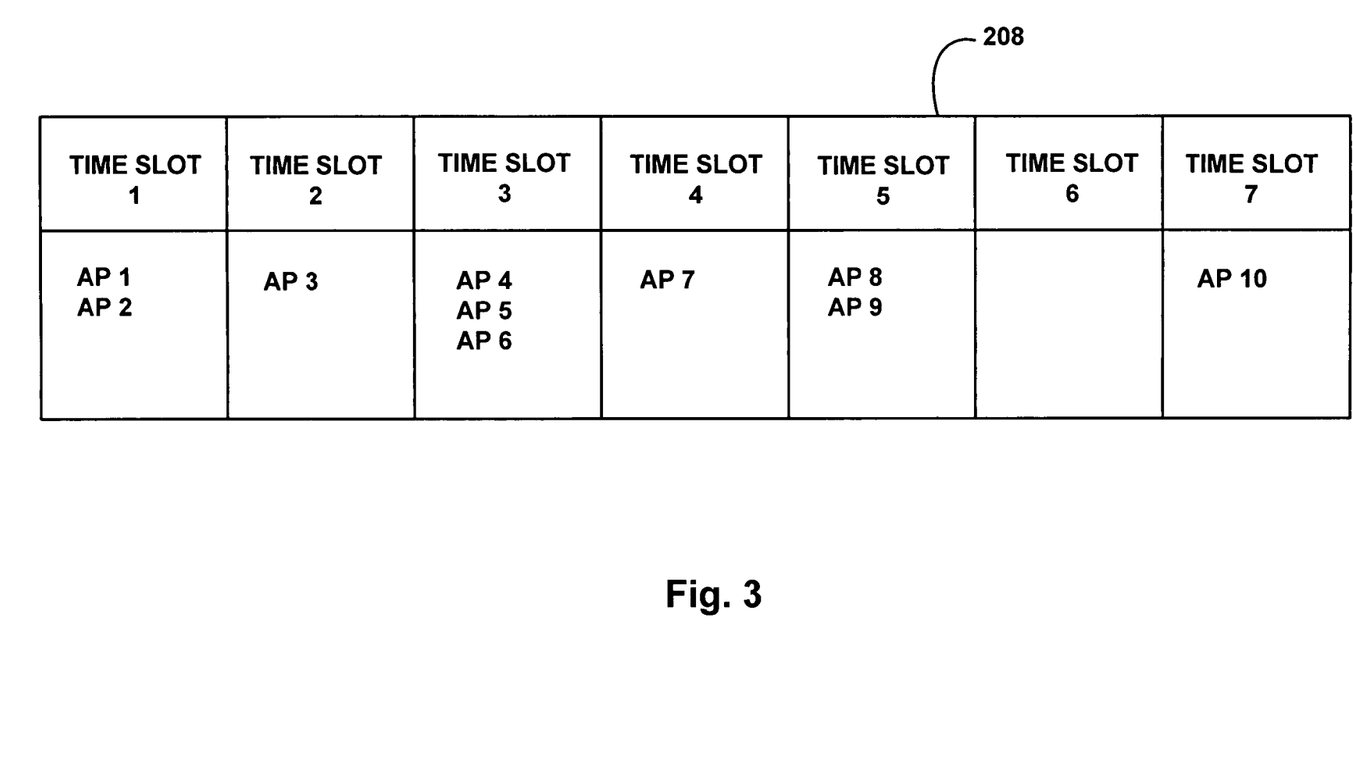
FIG. 3 is a diagram illustrating access probe collisions in the access channel of the reverse-link of the air interface shown in FIG. 2.

Referring to FIG. 3, a table is shown that illustrates how access probes are communicated from a mobile station to a base station. The table in FIG. 3 shows seven consecutive timeslots in the reverse-link—access channel 208 of the air interface 107 of FIGS. 1 and 2. The table in FIG. 3 represents the timeslots of the access channel 208 for a particular sector in a wireless communications system. These timeslots are designated Time Slot-1 through Time Slot-7. In each timeslot, access probes that are communicated by the mobile stations operating in this particular sector are shown in respective columns. As shown in FIG. 3, ten access probes are represented, which are designated AP1 through AP10.

For the particular situation illustrated in FIG. 3, access probe collisions would occur in timeslots Time Slot-1, Time Slot-3 and Time Slot-5. In comparison, no collisions would occur and valid access probes would be received (and the associated mobile devices registered) for the timeslots Time Slot-2, Time Slot-4 and Time Slot-7. As is also shown in FIG. 3, there are no access probes present in Time Slot-6. Therefore, an access probe collision or mobile station registration will not occur as a result of Time Slot-6.

Because the access probes AP1, AP2 AP4, AP5, AP6, AP8 and AP9 are subject to access probes collisions in their respective time slots, these access probes would be resent to the base station as result of the corresponding mobile stations not receiving a registration response to the access probes (e.g. registration will be retried). If there are a large number of mobile devices attempting to register in the particular sector (e.g., in response to a reg_zone directive, periodically registering in accordance with the reg_period directive, or registering as part of the process of placing or receiving a call), the number of time slots that experience access probe collisions may increase and, consequently the number of retries being attempted and associated access probe collisions will continue to grow.

Example Access Probe Collision Conditions

Figure 4:
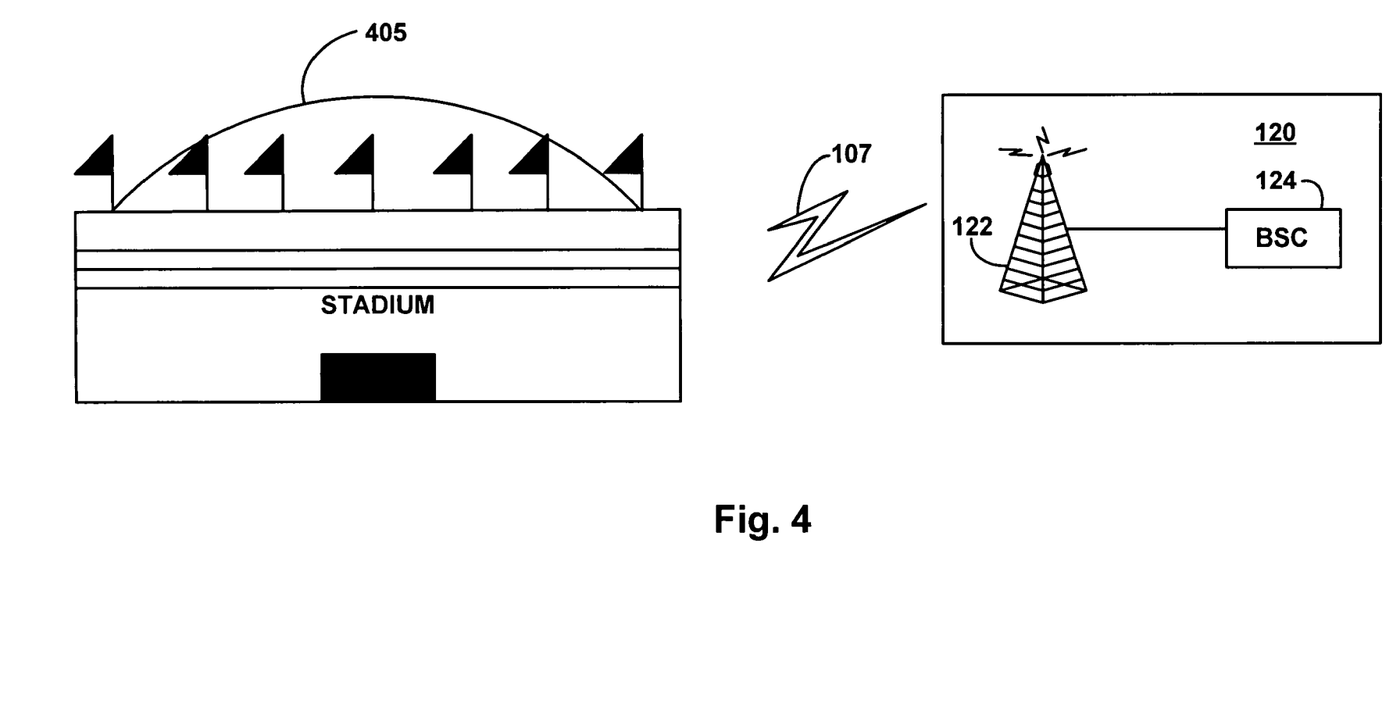
FIG. 4 is a diagram illustrating an example situation in which implementing the embodiments disclosed here will reduce the occurrence of access probe collisions.

FIG. 4 illustrates a situation where a significant number of access probe collisions may occur. The base station 120 of FIG. 1 is shown in FIG. 4 in proximity to a football stadium 405. During a football game, a large number of mobile station users will enter the particular sector (or sectors) that is (are) serving the area in which the football stadium 405 is located. For the sake of illustration, the coverage area for the stadium 405 will be described as a single sector, though multiple sectors may be involved. As more and more mobile stations enter this particular sector, the number of access probes being generated will continue to increase. Specifically, as previously described, the mobile stations just entering the sector that is serving the football stadium 405 will send access probes in response the reg_zone directive communicated in the control channel of the air interface 107. Additionally, as the number of mobile stations in the stadium increases, the number of periodic registrations (and corresponding access probes) in accordance with the reg_period directive will also increase. Further, at certain points of the game being played (e.g., between quarters, at halftime or at the game's conclusion) a large number of mobile station users may place calls, such as to check voicemail, call friends or family, etc. This large amount of contemporaneous calling will further increase the number of attempted registrations (and associated access probes) that are occurring during those time periods and, thus, also further increase the likelihood of access probe collisions occurring.

The likelihood of access probe collisions occurring in situations such that illustrated in FIG. 4 and describe above may be reduced by increasing the periodic registration period defined in the reg_period directive under certain load conditions on the air interface 107 or, alternatively, based on the number of mobile stations that are remaining within a particular sector's coverage area (e.g., are stationary relative to the radio-frequency coverage area of the sector). Various techniques for adjusting the registration period will now be described with reference to FIGS. 5-9.

Methods for Dynamically Adjusting a Mobile Station Registration Period

FIGS. 5-9 are flowcharts that illustrate various methods for dynamically adjusting a periodic registration period for mobile stations operating in a particular sector of a wireless communications system. The methods illustrated in FIGS. 5-9 are discussed with reference to FIGS. 1-4. Again, while these methods are described generally in the context of a CDMA2000 wireless communications system, other implementations are possible, such as in a GSM wireless communication system, for example.

Figure 5:
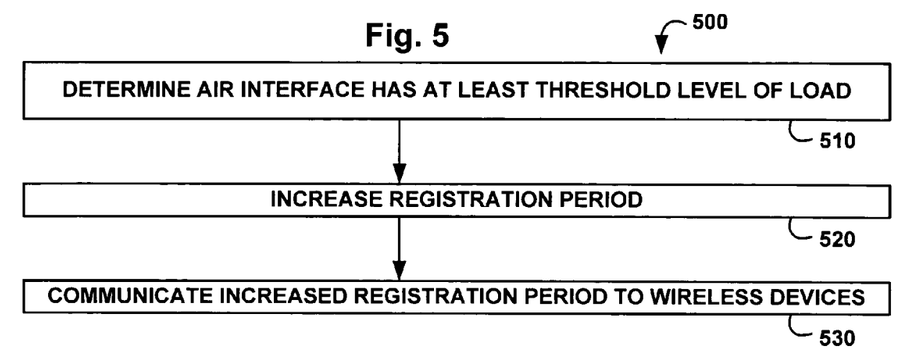
FIG. 5 is a flowchart illustrating a method for dynamically adjusting mobile station registration periods based on air interface load conditions.

FIG. 5 is a flow chart that illustrates a high level method 500 for dynamically adjusting the radio-frequency registration period for mobile stations operating in a wireless communications system, such as the registration period associated with the reg_period directive in a CDMA 2000 wireless communications system. The method 500 includes, at block 510, determining that the air interface 107 of FIGS. 1 and 2 has at least a threshold level of load. For example, such a determination may be made by determining that a certain percentage of bandwidth of the air interface (or of a certain channel of the air interface) is occupied communicating wireless signals between the mobile stations 105, 110 and 115 and the base station 120.

Once it is determined that the air interface 107 has at least the threshold level of load, the frequency of registration is reduced (e.g., the registration period in the reg_period directive is increased). The process of changing the registration period parameter could be implemented using service logic that is stored and executed on the BSC 124, for example. Of course, such service logic could be stored and executed elsewhere in the system 100, such as in the switch/gateway 125, as one alternative. Once the registration period parameter is increased, the new value of the parameter is communicated to the mobile stations 105, 110 and 115 in the reg_period directive, which is communicated in the control channel of the forward-link of the air interface 107.

After receiving the revised registration period parameter, the mobile stations 105, 110 and 115 adjust the period at which they periodically re-register with in the system 100 in accordance with the modified registration period, This results in a reduction in the number of periodic registrations in a given time period and corresponding decrease in the likelihood of an access probe collision. By way of example and referring again to the example of FIG. 4, if there are ten-thousand mobile stations operating in the stadium 405 and the periodic registration period is doubled, the number of periodic registrations received will decrease from ten-thousand in a given time period to five-thousand in the same period of time, resulting in a dramatic increase in the available timeslots in the reverse-link—access channel 209 of the air interface 107 for communication of access probes associated with, for example, mobile station users placing outgoing calls (e.g., at the conclusion of the game).

Adjustment Based on Reverse-Link Load

Figure 6:
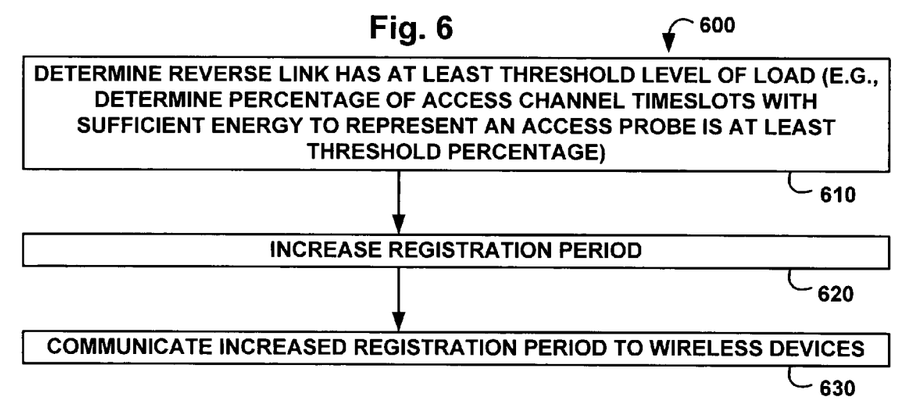
FIG. 6 is a flowchart illustrating a method for dynamically adjusting mobile station registration periods based on reverse-link air interface load conditions.

FIG. 6 is a flowchart that illustrates a method 600 for adjusting the periodic registration period based on the reverse-link load of the air interface for mobile stations operating in a wireless communications system, such as system 100 of FIG. 1. The method 600 includes, at block 610, determining that the reverse-link has at least a threshold level of load. As indicated in block 610, this determination can be made by determining the number of timeslots in an access channel of the reverse-link of the air interface 107 that contain sufficient energy to represent an access probe. Referring again to the table in FIG. 3, for this situation, this determination would result in all of the timeslots except Time Slot-6 being determined to include sufficient energy to represent an access probe. Therefore, approximately 85% of the timeslots would be determined as being "occupied." However, Time Slot-1, Time Slot-3 and Time-Slot 5 would not have a verifiable access probe (e.g., verified using a CRC) due to the access probe collisions that would occur in those time slots. Nevertheless, the fact that an access probe collision occurs in each of these slots makes it desirable to designate those slots as occupied so that they are accounted for in determining the load on the reverse-link—access channel 209 of the air interface 107. This determination can be made, for example, using service logic that is implemented in the base station 120 that monitors the number of occupied timeslots on the access channel 209 over a particular time period and determines the percentage of occupancy based on the number of timeslots available during that particular time period.

If the threshold for reverse-link load in the method of FIG. 6 were set at 60%, the situation illustrated in FIG. 3 would result in an increase in the periodic registration period as the 85% occupancy for the situation illustrated in FIG. 3 is above a threshold of 60%. Once it is determined that there is at least the threshold level of load (occupancy) on the reverse-link—access channel 209 of the air interface 107 (e.g., greater than 60%), the periodic registration period for the mobile stations is increased at block 620. The amount of the increase depends on the particular situation and may be dynamically adjustable based the number of adjustments that have been made in a certain period of time, or the increase may be predetermined. The process of changing the periodic registration period parameter may also be accomplished using service logic that is implemented in, for example, the BSC 124 of FIG. 1. At block 630, the base station 120 communicates the modified registration period parameter to the mobile stations 105, 110 and 115 in a control channel message (e.g., reg_period directive) over the air interface 107. Once the modified registration period parameter is received, the mobile stations 105, 110 and 115 will conduct their periodic registrations in accordance with the modified parameter.

After the registration period parameter is modified, the base station 120 may continue to monitor the load on the air interface 107 (in this case, the reverse-link). Once the load drops below the designated threshold (e.g., 60% in the above example) the base station 120 may restore the registration period parameter to its original value and communicate another reg_period directive to the mobile stations, which will then resume periodic registration at the original (e.g., default) registration period after receiving this directive.

Adjustment Based on Forward-Link Load

Figure 7:
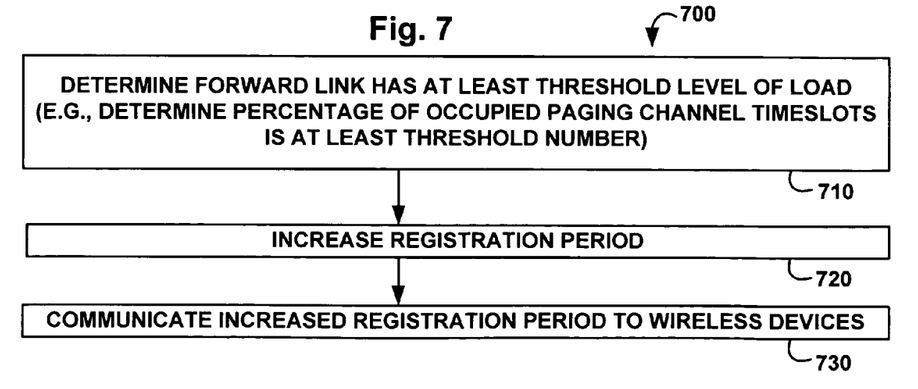
FIG. 7 is a flowchart illustrating a method for dynamically adjusting mobile station registration periods based on forward-link air interface load conditions.

FIG. 7 is a flowchart that illustrates a method 700 for adjusting the registration period for mobile stations based on the forward-link load of the air interface for mobile stations operating in system 100. The method 700 includes, at block 710, determining that the forward-link has at least a threshold level of load. As indicated in block 710, this determination can be made by determining the number of timeslots in the forward-link—paging channel 208 of the air interface 107 that are occupied. For the method 700, the overall occupancy of the paging channel 208 may be determined (e.g., regardless of the type of information being communicated in each of the paging channel 208's timeslots) or, alternatively, the occupancy of the paging channel 208's timeslots may be determined based on the number of timeslots that are carrying access probe acknowledgements (responses to registrations requests).

In operation, the base station 120 will know how many access probe acknowledgements (or other types of paging channel messages) it is sending on the forward-link—paging channel 208 in a given period of time, as well as how many timeslots are available on the forward-link—paging channel 208 in the given period of time. The base station 120 may monitor the number of access probe acknowledgments using service logic that is present and executed on the BSC 124, for example. Then, based on this information, the base station 120 can readily determine what percentage of the forward-link—paging channel 208's timeslots are occupied with access probe acknowledgments (or with other types of paging channel messages). Based on this percentage, the base station 120 can determine if a designated threshold is met or exceeded and adjust the periodic registration period accordingly.

Alternatively, the base station 120 could perform the forward-link threshold analysis by comparing the number of access probe acknowledgements that it wants to send in a given period of time with the number of acknowledgements that it is actually able to send in that period of time to determine an occupancy percentage for the forward-link—paging channel 208. The base station 120 may then compare this percentage to the designated threshold to determine if an adjustment to the periodic registration period is appropriate.

As with the methods 500 and 600, the process of changing the periodic registration parameter based on the loading of the forward-link of the air interface 107 may be accomplished using service logic that is implemented in, for example, the BSC 124 of FIG. 1. For the method 700, the base station 120 communicates the modified registration period parameter to the mobile stations 105, 110 and 115 in a control channel message (e.g., the reg_period directive) over the air interface 107 at block 730. After the modified parameter is received by the mobile stations, they will conduct their periodic registrations in accordance with the new registration period.

The methods 600 and 700 of FIGS. 6 and 7 may be implemented individually or may be implemented together. In an embodiment where the methods 600 and 700 are implemented together, the base station 120 would detect that the forward-link load (e.g., paging channel 208 occupancy) exceeds a first designated threshold and that the reverse-link load (e.g., access channel 209 occupancy) exceeds a second designated threshold. Based on the determinations that the forward-link load and the reverse-link load both exceed their designated thresholds, the base station 120 will conclude that it should responsively increase the periodic registration period, such as in the manner described above.

Adjustment Based on Stationary Nature of Mobile Stations

Figure 8:
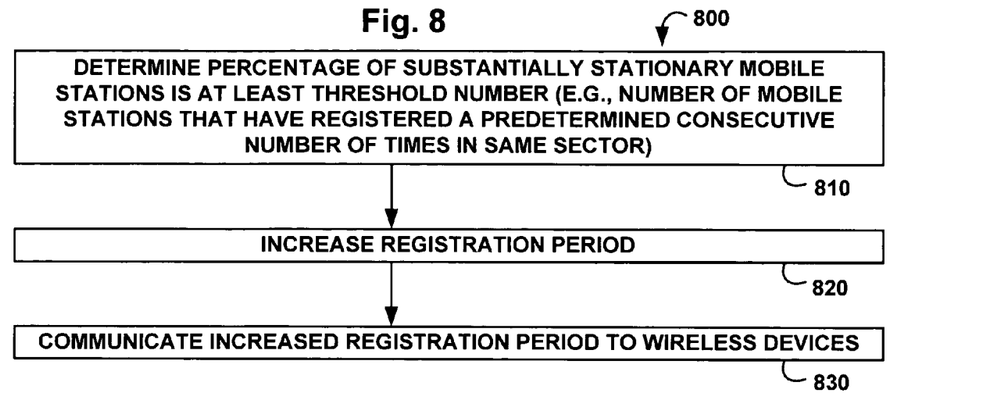
FIG. 8 is a flowchart illustrating a method for dynamically adjusting mobile station registration periods based on the stationary nature of mobile stations in a given coverage area.
Figure 9:
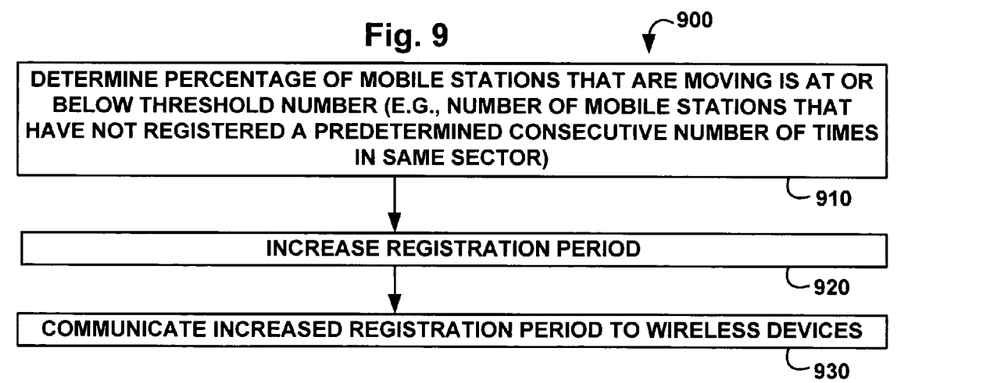
FIG. 9 is a flowchart illustrating a method for dynamically adjusting mobile station registration periods based on the mobile nature of mobile stations in a given coverage area.

FIG. 8 is a flowchart that illustrates a method for adjusting the registration period for mobile stations based on the stationary nature of the mobile stations operating within the coverage area of a particular sector. The method 800 includes, at block 810, determining that at least a threshold number of mobile stations in the particular sector's coverage area are substantially stationary. By way of example, referring again to FIG. 4, during or immediately after the football game being held at the stadium 405, many mobile station users will likely be "stationary" in that they will remain in the same coverage area (e.g., sector) for a while. In this situation, less need exists to have those mobile stations automatically register as often as if they were moving around, where they would be approaching and/or crossing into other coverage areas (e.g., other sectors).

The base station 120 can apply various procedures to measure the extent to which mobile stations are stationary. As indicated at block 810, this determination can be made by determining the number (or percentage) of mobile stations operating within the sector that have registered in the particular sector a predetermined number of times. This determination can be made in a number of ways. For example, the base station 120 can maintain a database table that includes a record for each mobile station operating in the particular sector's coverage area, and each record can include fields for (i) a mobile station identifier (e.g., MIN and/or ESN), (ii) the last sector in which the mobile station registered, and (iii) a Boolean flag indicating whether the last sector in which the mobile station registered was the same as the second-to-last sector in which the mobile station registered. Each time a mobile station registers, the base station 120 can then update the mobile station's record in this table. In such an embodiment, the BTS 122 could add the sector ID into the access probe received from the mobile station before communicating the access probe to the BSC 124. The BSC would then update the database table. Periodically or in response to some other triggering event, the base station 120 can then determine from the table what percentage of the mobile stations are flagged as having been in the same sector for their last two registrations. This percentage would be a measure of the extent to which the mobile stations are stationary. Alternatively, the percentage of mobile stations that have registered in the same sector three times, four times, or any number of times may be determined as a measure of the stationary nature of the mobile stations operating within the sector's coverage area.

If the base station 120 determines that at least a threshold percentage of the mobile stations are stationary, then the base station 120 will conclude that it should responsively increase the periodic registration period, such as in the manner that was described above. The registration period is then increased at block 820 and communicated to the mobile stations operating in the sector's coverage area at block 830.

As an alternative to adjusting the mobile station registration period based on the stationary nature of the mobile stations operating within a particular sector, the registration period can instead be adjusted based on the mobile nature of those mobile stations. Such an approach is illustrated by the flowchart in FIG. 9, which shows a method 900. At block 910 of the method 900, a determination is made that the percentage of mobile stations that are moving within the particular sector's coverage area is at or below a threshold. This determination may be made, for example, using a database table that is substantially similar to the database table described above with respect to FIG. 8. For the method 900, the base station 120 would determine the percentage of mobile stations that have registered in the particular sector no more than a threshold number of times. For example, the base station 120 could determine the percentage of mobile stations that have registered only one time in the particular sector. If this percentage is at or below the designated threshold, that is an indication that there are not a significant amount of mobile stations moving in and out of the coverage area (e.g., which is akin to determining that a significant number of mobile stations are stationary in the coverage area). In this situation, the base station 1200 will determine that an increase in the mobile station registration period is appropriate. In response to the determination at block 910, the registration period is increased at block 920 and is then communicated to the mobile stations operating in the sector at block 930, in the same fashion as has been previously described.

The methods 800 and 900 may be implemented in conjunction with any of, or combination of the methods illustrated in FIG. 5-7. For example, in an embodiment that combines the method 600 and the method 800, the base station 120 determines that at least a threshold percentage of the mobile stations are stationary and that the reverse-link load (e.g., in the access channel) exceeds a threshold. In response to these determinations, the base station 120 would conclude that it should responsively increase the periodic registration period.

CONCLUSION

Various arrangements and embodiments in accordance with the present invention have been described herein. It will be appreciated, however, that those skilled in the art will understand that changes and modifications may be made to these arrangements and embodiments, as well as combinations of the various embodiments without departing from the true scope and spirit of the present invention, which is defined by the following claims.

What is claimed is:

1. A method for handling registration requests in a cellular wireless communication system, the method comprising:
   determining that a load on an air interface in the cellular wireless communication system is at least a threshold level of load; and
   responsive to determining that the load on the air interface in the cellular wireless communication system is at least the threshold level of load, reducing a frequency at which mobile stations register with the cellular wireless communication system via the air interface,
   wherein reducing the frequency at which mobile stations register with the cellular wireless communication system via the air interface comprises a network element sending to the mobile stations, via the air interface, an indication of an increased registration-period for use by the mobile stations;

wherein determining that the load on the air interface is at least the threshold level of load comprises detecting that there is at least a threshold level of reverse-link air interface load;

wherein detecting that there is at least the threshold level of reverse-link air interface load comprises detecting that there is at least a threshold level of occupancy on an air interface access channel;

wherein detecting that there is at least the threshold level of occupancy on the air interface access channel comprises detecting that at least a threshold number of access channel timeslots are occupied; and wherein detecting that at least the threshold number of access channel timeslots are occupied comprises detecting that there is at least a threshold percentage of access channel timeslots which contain energy sufficient to represent an access probe.

2. The method of claim 1, wherein determining that the load on the air interface is at least the threshold level of load further comprises detecting that there is at least a threshold level of forward-link air interface load.

3. The method of claim 2, wherein detecting that there is at least the threshold level of forward-link air interface load comprises detecting that there is at least a threshold level of occupancy on an air interface paging channel.

4. The method of claim 3, wherein detecting that there is at least a threshold level of occupancy on the air interface paging channel comprises detecting that at least a threshold number of paging channel timeslots are occupied.

5. The method of claim 1, wherein determining that the load on the air interface is at least the threshold level of load further comprises determining that at least a threshold number of mobile stations within a common coverage area are substantially stationary.

6. The method of claim 5, wherein determining that at least the threshold number of mobile stations are substantially stationary comprises determining that at least a threshold percentage of mobile stations have registered twice in a row in the common coverage area.

7. The method of claim 5, wherein determining that at least the threshold number of mobile stations are substantially stationary comprises determining that at least a threshold percentage of mobile stations have registered at least a threshold number of times in the common coverage area.

8. The method of claim 1, wherein determining that the load on the air interface is at least the threshold level of load further comprises determining that less than a threshold number of mobile stations are moving into or out of a common coverage area.

9. The method of claim 1, wherein determining that the load on the air interface is at least the threshold level of load comprises detecting that there is at least a threshold level of forward-link air interface load.

10. The method of claim 9, wherein detecting that there is at least the threshold level of forward-link air interface load comprises detecting at least a threshold level of occupancy on an air interface paging channel.

11. The method of claim 1, further comprising operating a base station in the cellular wireless communication system to carry out the determining and reducing steps, wherein the reducing step is carried out in cooperation with one or more mobile stations within a coverage area of the base station.

12. The method of claim 1, wherein the network element comprises a base station.

13. A method for handling registration requests in a mobile communications system, the method comprising:
    determining that a load on an air interface in a cellular wireless communication system is at least a threshold level of load by:
    (i) detecting that there is at least a threshold level of reverse-link air interface load;
    (ii) detecting that there is at least a threshold level of forward-link air interface load; and
    (iii) determining that at least a threshold number of mobile stations within a common coverage area are substantially stationary; and
    responsive to determining that the load on the air interface in the cellular wireless communication system is at least the threshold level of load, reducing a frequency at which mobile stations register with the cellular wireless communication system via the air interface,
    wherein reducing the frequency at which mobile stations register with the cellular wireless communication system via the air interface comprises a network element sending to the mobile stations, via the air interface, an indication of an increased registration-period for use by the mobile stations;
    wherein detecting that there is at least the threshold level of reverse-link air interface load comprises detecting that there is at least a threshold level of occupancy on an air interface access channel;
    wherein detecting that there is at least the threshold level of occupancy on the air interface access channel comprises detecting that at least a threshold number of access channel timeslots are occupied; and
    wherein detecting that at least the threshold number of access channel timeslots are occupied comprises detecting that there is at least a threshold percentage of access channel timeslots which contain energy sufficient to represent an access probe; and
    wherein the method is performed by a network node.

14. A base station for use in a cellular wireless communications system, the base station including service logic that, when executed, provides for:
    determining that a load on an air interface in a cellular wireless communication system is at least a threshold level of load; and
    responsive to determining that the load on the air interface in the cellular wireless communication system is at least the threshold level of load, reducing a frequency at which mobile stations register with the cellular wireless communication system via the air interface,
    wherein reducing the frequency at which mobile stations register with the cellular wireless communication system via the air interface comprises sending to the mobile stations, via the air interface, an indication of an increased registration-period for use by the mobile stations;
    wherein determining that the load on the air interface is at least the threshold level of load comprises detecting that there is at least a threshold level of reverse-link air interface load;
    wherein detecting that there is at least the threshold level of reverse-link air interface load comprises detecting that there is at least a threshold level of occupancy on an air interface access channel;
    wherein detecting that there is at least the threshold level of occupancy on the air interface access channel comprises detecting that at least a threshold number of access channel timeslots are occupied; and wherein detecting that at least the threshold number of access channel timeslots are occupied comprises detecting that there is at least a threshold percentage of access channel timeslots which contain energy sufficient to represent an access probe.

15. The base station of claim 14, wherein the service logic, when executed, further provides for determining that the load on the air interface is at least the threshold level of load by determining that at least a threshold number of mobile stations in a coverage area of the base station are substantially stationary.

16. The base station of claim 14, wherein determining that the load on the air interface is at least the threshold level of load further comprises detecting that there is at least a threshold level of forward-link air interface load.

17. The base station of claim 16, wherein the service logic, when executed, further provides for determining that the load on the air interface is at least the threshold level of load by determining that less than a threshold number of mobile stations are moving into or out of a coverage area of the base station.

18. The method of claim 13, wherein the network element comprises a base station.

* * * * *